United States Patent
Lee et al.

(10) Patent No.: US 7,596,638 B2
(45) Date of Patent: Sep. 29, 2009

(54) METHOD, SYSTEM, AND APPARATUS TO DECREASE CPU TEMPERATURE THROUGH I/O BUS THROTTLING

(75) Inventors: John P. Lee, Tempe, AZ (US);
Aniruddha P. Joshi, Chandler, AZ (US);
Geetani R. Edirisooriya, Tempe, AZ (US)

(73) Assignee: Intel Corporation, Santa Clara, CA (US)

( * ) Notice: Subject to any disclaimer, the term of this patent is extended or adjusted under 35 U.S.C. 154(b) by 412 days.

(21) Appl. No.: 10/873,779

(22) Filed: Jun. 21, 2004

(65) Prior Publication Data

US 2005/0283561 A1 Dec. 22, 2005

(51) Int. Cl.
*G06F 3/00* (2006.01)
(52) U.S. Cl. ......... 710/18; 702/130; 702/132; 713/300; 713/322; 713/323
(58) Field of Classification Search .......... 710/18; 713/322, 300, 323; 702/130, 132
See application file for complete search history.

(56) References Cited

U.S. PATENT DOCUMENTS

| | | | | |
|---|---|---|---|---|
| 5,745,375 A | * | 4/1998 | Reinhardt et al. | 700/286 |
| 5,754,867 A | * | 5/1998 | Walker | 713/322 |
| 6,148,397 A | * | 11/2000 | Chang | 713/1 |
| 6,175,929 B1 | * | 1/2001 | Hsu et al. | 713/500 |
| 6,338,150 B1 | * | 1/2002 | Johnson et al. | 714/39 |
| 7,065,599 B2 | * | 6/2006 | King et al. | 710/301 |
| 7,146,510 B1 | * | 12/2006 | Helms et al. | 713/300 |
| 7,174,467 B1 | * | 2/2007 | Helms et al. | 713/300 |
| 2003/0088799 A1 | * | 5/2003 | Bodas | 713/320 |
| 2004/0205370 A1 | * | 10/2004 | McDevitt et al. | 713/500 |
| 2005/0246469 A1 | * | 11/2005 | Chu | 710/301 |

FOREIGN PATENT DOCUMENTS

JP 2000-187523 * 4/2000

OTHER PUBLICATIONS

Microsoft, Computer Dictionary, 2002, Microsoft Press, fifth edition, p. 395.*

* cited by examiner

*Primary Examiner*—Niketa I Patel
(74) *Attorney, Agent, or Firm*—Derek J. Reynolds

(57) ABSTRACT

A method, apparatus, and system are disclosed. In one embodiment the method detects a temperature event in a processor and then modifies the bus frequency of an I/O bus coupled to an I/O controller hub in response to the temperature event. In another embodiment, the apparatus includes a temperature detection unit that detects a temperature event in a processor and, additionally, a bus frequency modification unit that will modify the bus frequency of an I/O bus in response to the temperature event.

24 Claims, 4 Drawing Sheets

METHOD, SYSTEM, AND APPARATUS TO DECREASE CPU TEMPERATURE THROUGH I/O BUS THROTTLING

FIELD OF THE INVENTION

The invention relates to decreasing the temperature of a processor. More specifically, the invention relates to throttling the frequency of an I/O bus in response to a processor temperature event to limit the amount of incoming data from the bus that the processor must manage.

BACKGROUND OF THE INVENTION

Total system management is important in the server environment. Particularly, it is critically important to keep the CPU(s) in a server thermally stable. In recent years with the advancing state of processor capabilities coupled with the decreasing size of process technology, the standard CPU is pushing the upper bounds of thermal limitations. A variety of technologies have been introduced to help reduce heat dissipation of the processor die of a high performance CPU. Recently, Intel® Corporation has introduced Enhanced Intel Speedstep® technology which turns off circuitry and shifts through multiple clock speeds and core voltages according to processor load to save power and reduce the CPU's temperature. However, in many instances, the temperature of the processor die is high (i.e. just below, equal to, or beyond the upper bound thermal limit as indicated by the processor manual or specification) because heat sources external to the processor itself can heat up the internal ambient air temperature of the system case (i.e. the external housing of the computer system, which frequently contains the motherboard, the power supply, the CPU, the system memory, and multiple peripheral devices). High-performance peripheral devices, located on a bus coupled to the processor, are common heat sources that are external to the processor but in a close vicinity to affect the ambient temperature of the system case. Slowing down the CPU might not be enough in instances such as this because devices independent from the processor are causing the system to potentially overheat. Servers and workstations can have many high-performance peripheral devices connected to one or more high speed I/O buses, such as a PCI-X bus. These peripherals can potentially heat the ambient air temperature around the processor to significantly high levels all by themselves. This can cause the processor to overheat even if the processor itself is not strained with a computationally intensive workload. It is therefore important that an alternative method exists to reduce processor temperatures in a system with high performance peripherals connected to a high performance I/O bus.

BRIEF DESCRIPTION OF THE DRAWINGS

The present invention is illustrated by way of example and is not limited by the figures of the accompanying drawings, in which like references indicate similar elements, and in which.

DETAILED DESCRIPTION OF THE INVENTION

Embodiments of an effective method to throttle the frequency of an I/O bus in response to a processor temperature event are disclosed. In the following description, numerous specific details are set forth. However, it is understood that embodiments may be practiced without these specific details. In other instances, well-known elements, specifications, and protocols have not been discussed in detail in order to avoid obscuring the present invention.

Figure 1:
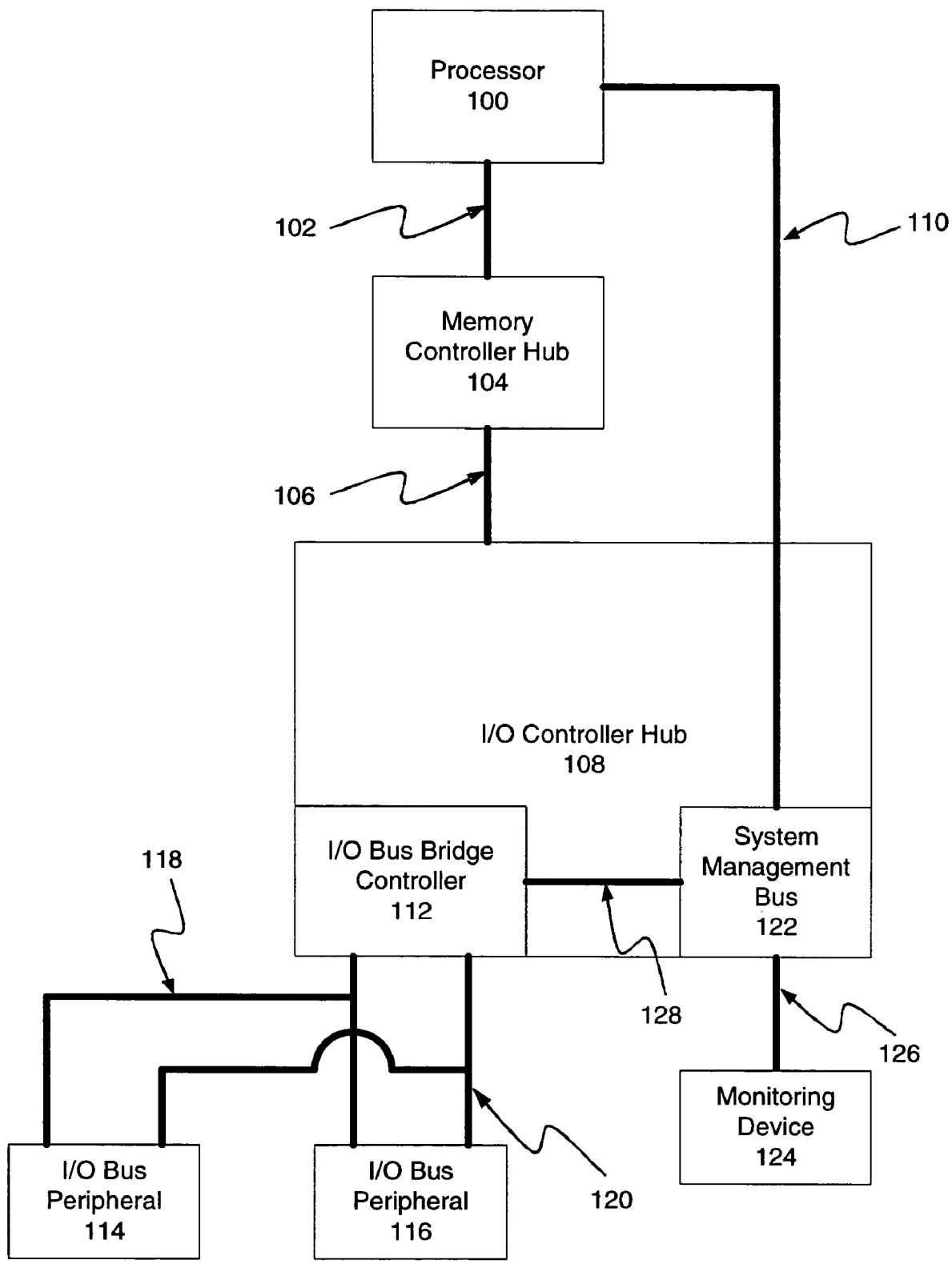
FIG. 1 is a block diagram of a computer system in one embodiment.

FIG. 1 is a block diagram of a computer system in one embodiment. The computer system may include a central processing unit (CPU) 100, a memory controller hub (MCH) 104, and an I/O controller hub (ICH) 108. CPU 100 may be coupled to MCH 104 via a host bus 102. MCH 104 and ICH 108 may be coupled via a hub bus 106. ICH 108 may include an I/O bus bridge controller 112 and a System Management Bus (SMBus) host controller 122. The SMBus is a two-wire interface through which various system component chips can communicate with each other and with the rest of the computer system. The SMBus provides a control bus for system and power management related tasks. ICH 108 may receive a thermal signal from CPU 100 via the thermal signal input 110. ICH may provide the received thermal signal from CPU 100 via the thermal signal input 110 to SMBus host controller. I/O bus bridge controller 112 may receive commands from an external monitoring device 124 over SMBus 126 and 128 via SMBus host controller 122. In many embodiments, the external monitoring device 124 may be referred to as a system management controller (SMC), which includes any microcontroller, processor, or other type of device that can function as a system management controller-type device. A system management controller-type device includes devices that can communicate over an SMBus regarding system and power management tasks. The SMC 124 has the capability of sending a reset command to a particular I/O bus and can interface the SMBus 126 such as for example, in one embodiment, a baseboard management controller. The I/O bus bridge controller 112 may communicate with I/O bus peripheral devices 114 and 116 via I/O bus 118. The I/O bus bridge controller 112 may send a reset signal to reset and initialize all devices on the I/O bus via the reset signal line 120.

In one embodiment, the I/O bus bridge controller 112 is a PCI-X bus bridge controller. In other embodiments, the I/O bus bridge controller 112 can be a conventional PCI bus bridge controller, a PCI Express bus bridge controller, a USB bus controller, or a Serial ATA controller, among others. In one embodiment, the thermal signal input 110 bypasses the ICH 108 entirely and inputs directly into the SMC 124. In one embodiment, the source of the thermal signal input 110 is the THRM pin of the CPU 100 or its equivalent. In another embodiment, the source of the thermal signal input 110 is a temperature gauge that measures the ambient chassis temperature of the system the CPU 100 resides in, the CPU 100 die temperature, or any another relevant temperature. In other embodiments, the bus referred to as the SMBus can be one of many other system management-type control buses that are capable of transmitting system management commands between devices in a computer system.

Figure 2:
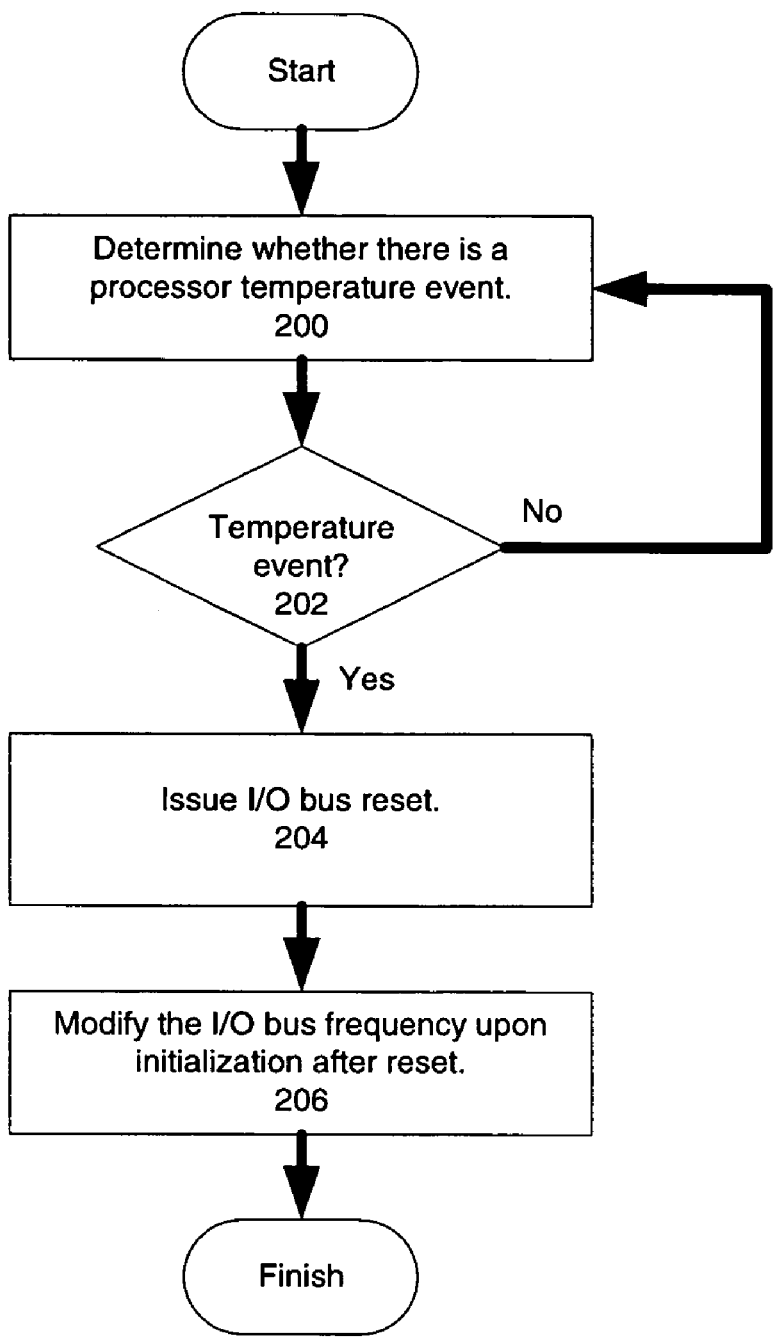
FIG. 2 is a flow diagram of one embodiment of a process for throttling an I/O bus in a system due to a CPU temperature event.

FIG. 2 is a flow diagram of one embodiment of a process for throttling an I/O bus in a system due to a CPU temperature event. The process is performed by processing logic that may comprise hardware (circuitry, dedicated logic, etc.), software (such as is run on a general purpose computer system or a dedicated machine), or a combination of both. Referring to FIG. 2, the process begins by processing logic determining whether there is a processor temperature event (processing block 200). In many embodiments, this determination can be completed by any capable device such as a microcontroller or a processor. In one embodiment, the determination is made by an SMC or baseboard management controller (BMC) that is coupled to the SMBus located in the same system as the monitored CPU. In another embodiment, the determination can be made by a CPU, microcontroller, or SMC-type equivalent controller located in a system external to the system in which the monitored CPU is located.

The information required for the processor temperature event check can include any form of real-time temperature measurements of the monitored CPU. In one embodiment, the information relayed from the monitored CPU to the monitoring controller is the binary output signal of the monitored CPU's thermal pin (e.g. commonly the THRM pin or its equivalent in any given CPU). In another embodiment, the information relayed from the monitored CPU to the monitoring controller is an ambient temperature in the CPU's system chassis obtained by a temperature sensor installed in an appropriate location in the chassis. In yet another embodiment, the information relayed from the monitored CPU to the monitoring controller is the die temperature of the CPU obtained by either an external temperature sensor installed directly on or near the CPU's die or by a temperature sensor internal to the CPU, in which the CPU outputs real-time temperature information on one or more pins similar to the THRM pin. In above embodiments that utilize external temperature sensors, relaying information "from the monitored CPU" includes relaying information from the vicinity of the monitored CPU, not necessarily information that was sent by the CPU.

Next, if a temperature event has not taken place, the processing logic (at processing block 202) returns the process to again perform a determination as to whether a temperature event has taken place (processing block 200). Otherwise, the processing logic issues an I/O bus reset (processing block 204). In different embodiments, the I/O bus can be any bus such as, for example, a Peripheral Component Interface (PCI) bus, a PCI-X bus, a PCI Express bus, an Accelerated Graphics Port (AGP) bus, a USB bus, or a Serial ATA bus among many other high performance buses. In one embodiment, the particular I/O bus that is reset has two or more operational frequencies. Continuing with the process, after the I/O bus is reset, the processing logic modifies the I/O bus frequency during the I/O bus initialization phase (processing block 206). In one embodiment, the I/O bus frequency is lowered and thus, all peripherals residing on the I/O bus have their data bus transmission throughput subsequently limited by the lower bus frequency. The lower bus throughput reduces the maximum workload required by the CPU regarding processing incoming or outgoing information to and from the I/O bus. Thus, the I/O bus is effectively throttled and the CPU's workload relating to the I/O bus is reduced and the process is finished.

The process required to lower the I/O bus frequency depends on the particular type of I/O bus. For example, in the particular embodiment in which the I/O bus is a PCI-X bus, the process required to lower the bus frequency (e.g. from 66 MHz to 33 MHz) is the following:

Perform a PCI-X bus reset by asserting the RST# pin on the PCI-X host bridge controller that buses the RST# pin to all devices on the bus.

Deassert the M66EN pin PCI-X host bridge controller that buses the M66EN pin to all devices on the bus. Deasserting the M66EN pin lowers the bus frequency from the PCI-X standard 66 MHz to the conventional PCI standard 33 MHz.

Deassert the RST# pin on the PCI-X host bridge controller that buses the RST# pin to all devices on the bus. This allows the devices on the bus to initialize at the lower frequency.

Figure 3:
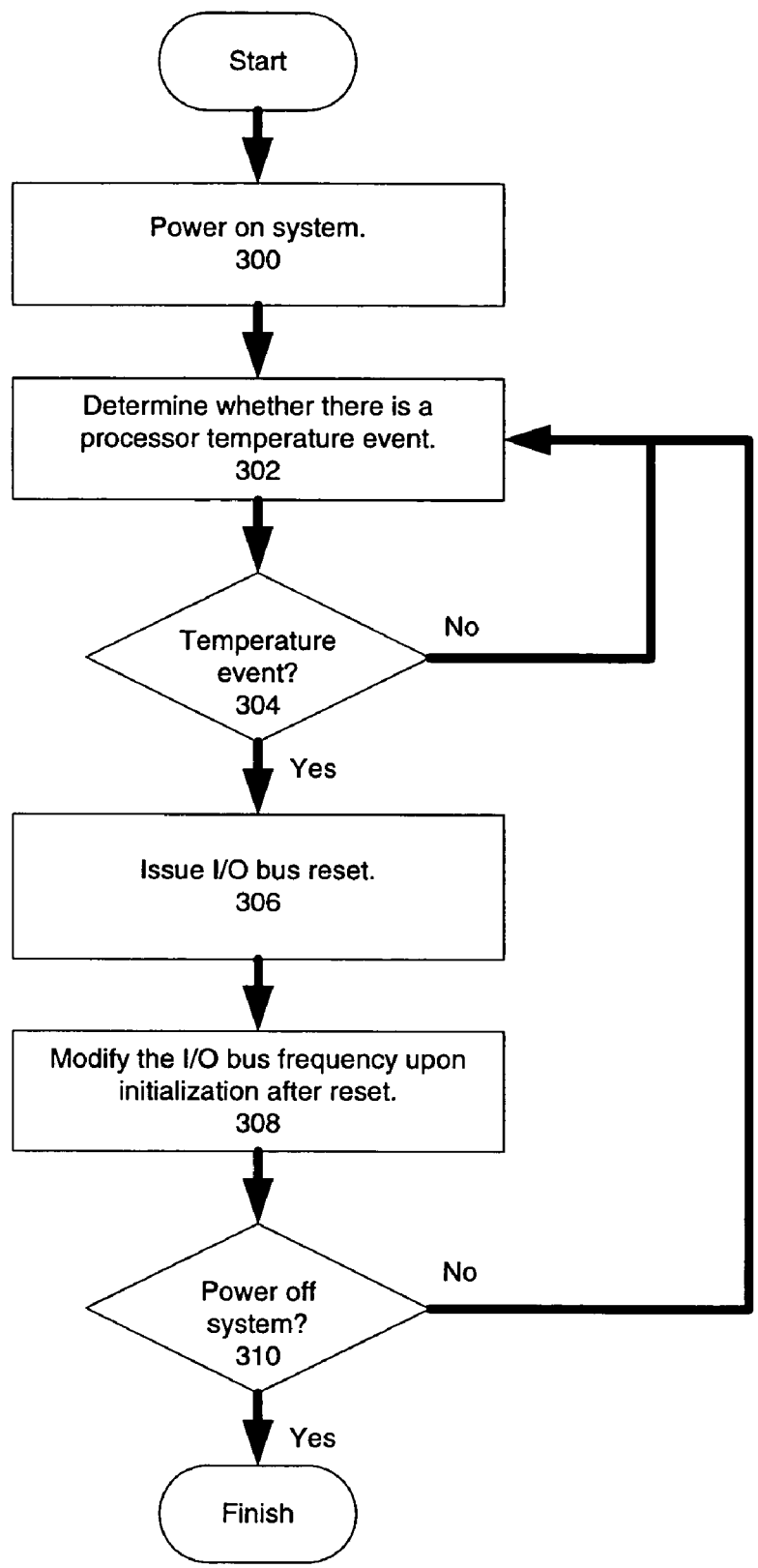
FIG. 3 is a flow diagram of one embodiment of a process to dynamically throttle an I/O bus using an active THRM pin.

In certain instances, the information received by the monitoring controller regarding the CPU temperature event will be more dynamic and therefore, not a one-time event as shown in FIG. 2. In one embodiment, the THRM pin that is being monitored by the controller is a sticky bit pin. In this embodiment, the THRM pin only registers a temperature event once for each time the CPU is powered on. In order to reset a sticky bit pin, the CPU would have to be reset. Although, in another embodiment, the THRM pin is a continuously active pin and not a sticky bit pin, and the pin remains at a high output state (logical one) when a temperature threshold is exceeded and the pin remains at a low output state (logical zero) when the temperature threshold has not been exceeded. In this embodiment, the THRM pin will change logical states every time the threshold temperature is passed in either direction. Thus, FIG. 3 is a flow diagram of one embodiment of a process to dynamically throttle an I/O bus using an active THRM pin. The process is performed by processing logic that may comprise hardware (circuitry, dedicated logic, etc.), software (such as is run on a general purpose computer system or a dedicated machine), or a combination of both. Referring to FIG. 3, the process begins by processing logic powering on the system that includes the monitored CPU (processing block 300). Next, the process continues by processing logic determining whether there is a processor temperature event (processing block 302). In one embodiment, this determination may include instituting a continuous active polling loop of the THRM pin, the real-time temperature data, or any other relevant temperature event information. In another embodiment, this determination may include a passive form of monitoring where the controller is woken up by a temperature event message or signal such as the THRM pin changing states.

Next, if a temperature event has not taken place, the processing logic (at processing block 304) returns the process to again perform a determination as to whether a temperature event has taken place (processing block 302). Otherwise, the processing logic issues an I/O bus reset (processing block 306). Continuing with the process, after the I/O bus is reset, the processing logic modifies the I/O bus frequency during the I/O bus initialization phase (processing block 308). In one embodiment, if the THRM pin indicates the current temperature is above the threshold temperature, the I/O bus frequency is lowered. In another embodiment, if the THRM pin indicates the current temperature is at or below the threshold temperature, the I/O bus frequency is increased. Next, the process either returns to monitoring for a processor temperature event (processing block 306) or, if the system is powered off (processing block 310), the process is finished.

In an embodiment where more than two I/O bus operational frequencies exist the process in FIG. 3 can be repeated to step up or down each of the consecutive I/O bus frequencies. Thus, if N is the high I/O bus frequency and the THRM pin indicates the current temperature is above the threshold temperature, the I/O bus frequency upon reset can be set at N−1. If the processor remains above the threshold temperature, the I/O bus frequency can be then set at N−2 upon reset. For example, N could equal 133 MHz for a given I/O bus, N−1 could then equal 100 MHz, N−2 could then equal 66 MHz, and so on. In one embodiment, these subsequent resets can have a time delay to account for the length of time the CPU would normally take to cool down from a decreased I/O bus throughput. In another embodiment, once the CPU temperature has passed below the threshold temperature, the bus would be issued a reset and the I/O bus frequency would be increased by one operational frequency (e.g., N+1). In yet another embodiment, once the CPU temperature has passed below the threshold temperature the bus would be issued a reset and the I/O bus frequency would be increased immediately back to the maximum operational frequency. The process required to increase the I/O bus frequency depends on the particular type of I/O bus. For example, in the particular embodiment in which the I/O bus is a PCI-X bus, the process required to raise the bus frequency (e.g. from 33 MHz to 66 MHz) is identical to the process required to decrease the bus frequency detailed above except that the M66EN pin would be asserted instead of deasserted.

Figure 4:
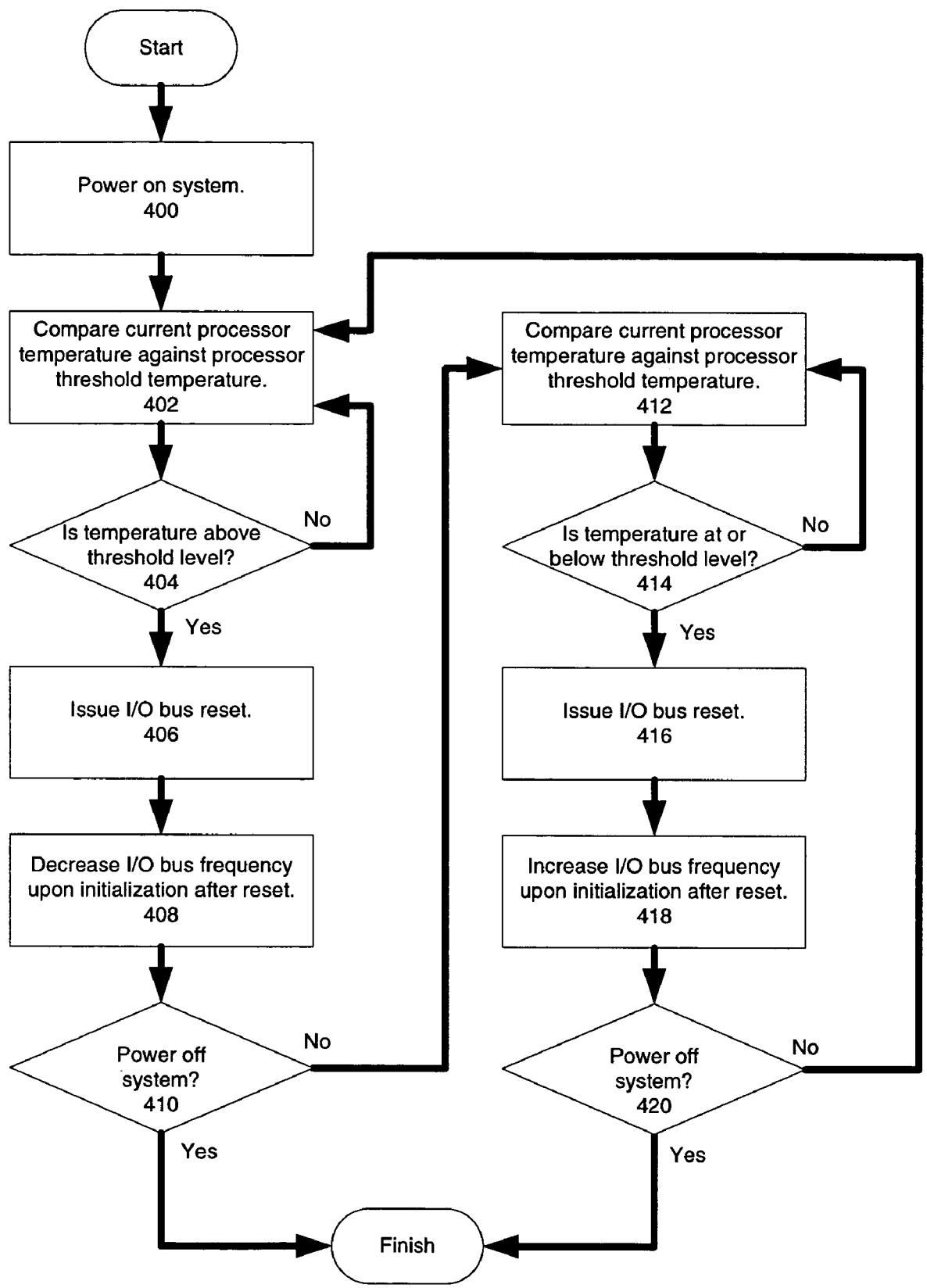
FIG. 4 is a flow diagram of one embodiment of a process to actively throttle an I/O bus using a temperature gauge.

As detailed above, the chassis ambient temperature, CPU die temperature, or any another relevant temperature can be monitored as well to determine if a processor temperature event has taken place. FIG. 4 is a flow diagram of one embodiment of a process to actively throttle an I/O bus using a temperature gauge. The process is performed by processing logic that may comprise hardware (circuitry, dedicated logic, etc.), software (such as is run on a general purpose computer system or a dedicated machine), or a combination of both. Referring to FIG. 4, the process begins by processing logic powering on the system that includes the monitored CPU (processing block 400). Next, the process continues by processing logic comparing the monitored CPU's current temperature against the processor threshold temperature (processing block 402). In one embodiment, the processor threshold temperature will be a predetermined temperature based on the thermal characteristics of the CPU, the thermo-mechanical cooling solution for the CPU, the characteristics of the silicon, metal, and other materials that the CPU is comprised of, as well as many other relevant factors.

Next, the processing logic determines whether the CPU's current temperature is above the processor threshold temperature based on the comparison (processing block 404). If the CPU's current temperature is at or below the processor threshold temperature then the CPU is at an acceptable temperature and no precautions need to be taken. In this case the processing logic returns the process to the comparison procedure (processing block 402). Otherwise, if the CPU's current temperature is above the processor threshold temperature the processing logic issues an I/O bus reset (processing block 406). After the I/O bus is reset, the processing logic decreases the I/O bus frequency during the I/O bus initialization phase (processing block 408). If the system is powered off (processing block 410) in any way, the process is finished. However, if the system with the monitored CPU is still actively running, the process continues by processing logic again comparing the monitored CPU's current temperature against the processor threshold temperature (processing block 412).

At this stage of the process it is inherent that the CPU's current temperature is above the processor threshold temperature, thus the processing logic determines whether the CPU's current temperature is below the processor threshold temperature (processing block 414) based on the processing logic comparison (processing block 412). If the CPU's current temperature is at or below the processor threshold temperature then the CPU is once again at an acceptable temperature level and the processing logic resets the I/O bus (processing logic 416) and increases the I/O bus frequency upon initialization (processing logic 418). Finally, if the system is powered off (processing block 420) in any way, the process is finished. Otherwise, the process returns again and the processing logic once again repeats the initial comparison (processing block 402). In one embodiment, stability will be the only concern for the CPU and not performance. In this embodiment, the temperature gauge process will be limited to just decreasing the I/O bus frequency if a temperature event takes place. Decreasing the I/O bus frequency is designed to help make sure the CPU is thermally stable by throttling I/O bus throughput down to a manageable level, whereas increasing the I/O bus frequency is designed to maximize performance if the CPU is well within its operational thermal envelope. Thus, decreasing the I/O bus frequency is more important from a stability standpoint.

In one embodiment, two processor threshold temperatures can be utilized: Temperature One, where the I/O bus frequency is decreased if the CPU temperature exceeds Temperature One; and Temperature Two, where the I/O bus frequency is increased if the CPU temperature drops below Temperature Two. These two temperatures can be spaced apart accordingly to allow for leeway if the CPU temperature is hovering at or near the threshold. The multiple threshold temperature levels will prevent the I/O bus from continuously ping-ponging the frequency up and down in rapid succession if the actual CPU temperature is right at the potential single temperature threshold level.

Thus, embodiments of an effective method to throttle the frequency of an I/O bus in response to a processor temperature event are disclosed. These embodiments have been described with reference to specific exemplary embodiments thereof. It will, however, be evident to persons having the benefit of this disclosure that various modifications and changes may be made to these embodiments without departing from the broader spirit and scope of the embodiments described herein. The specification and drawings are, accordingly, to be regarded in an illustrative rather than a restrictive sense.

The invention claimed is:

1. A method, comprising:
   detecting a temperature event in a processor; and
   modifying a bus frequency of only a first input/output (I/O) bus in response to the temperature event, wherein the I/O bus couples an I/O controller hub to at least one I/O device and the I/O controller hub is coupled to the processor.

2. The method of claim 1, wherein detecting a temperature event in a processor further comprises:
   monitoring a signal from a thermal event pin associated with the processor; and
   acknowledging a temperature event within the processor when the monitored signal changes.

3. The method of claim 2, wherein monitoring the signal further comprises monitoring the signal with a device separate from the processor.

4. The method of claim 3, wherein modifying a bus frequency further comprises:
   performing an I/O bus reset for the first I/O bus; and
   altering the I/O bus frequency of the first I/O bus after the I/O bus reset.

5. The method of claim 4, wherein the device is connected to an interface for interfacing with a bridge controller controlling the first I/O bus.

6. The method of claim 5, wherein performing the first I/O bus reset comprises sending an I/O bus reset command for the first I/O bus to the bus bridge controller from the device through the interface.

7. The method of claim 4, wherein altering the first I/O bus frequency further comprises reducing the first I/O bus frequency.

8. The method of claim 5, wherein the interface further comprises a System Management Bus.

9. The method of claim 1, wherein detecting a temperature event in a processor comprises:
   externally monitoring the temperature of the processor die; and
   acknowledging a temperature event within the processor when the monitored temperature reaches a predetermined level.

10. The method of claim 1, wherein the first I/O bus further comprises a peripheral data bus.

11. The method of claim 1, wherein the first I/O bus further comprises a PCI-X bus.

12. A system, comprising:
   a host bus;
   a processor coupled to the host bus;
   a bridge controller coupled to the host bus for receiving signals from the processor;
   a bus system that is connectable to the bridge controller, the bus system comprising:
      one or more I/O busses coupled to the bridge controller, each I/O bus of the one or more I/O busses including one or more expansion slots for receiving an I/O peripheral device;
   an interface connected to the bridge controller; and
   a device connected to the interface, wherein the device detects a temperature event in the processor and modifies the frequency of one or more of the I/O busses only in response to the temperature event.

13. The system of claim 12, wherein the system:
   monitors a signal from a thermal event pin associated with the processor; and
   acknowledges a temperature event within the processor when the monitored signal changes.

14. The system of claim 12, wherein the system modifies the bus frequency of the one or more of the I/O busses by:
   performing an I/O bus reset for each of the one or more I/O busses; and
   altering the I/O bus frequency of each of the one or more I/O busses after the I/O bus reset.

15. The system of claim 14, wherein the system reduces the I/O bus frequency each of the one or more I/O busses.

16. The system of claim 12, wherein the interface further comprises a System Management Bus.

17. The system of claim 12, wherein the system detects a temperature event by:
   externally monitoring the temperature of the processor die; and
   acknowledging a temperature event within the processor when the monitored temperature reaches a predetermined level.

18. The system of claim 12, wherein at least one of the one or more I/O busses further comprises a peripheral data bus.

19. The system of claim 12, wherein at least one of the one or more I/O busses further comprises a PCI-X bus.

20. An apparatus, comprising:
   a temperature detection unit to detect a temperature event in a processor; and
   a bus frequency modification unit to modify a bus frequency of only a first input/output (I/O) bus in response to the temperature event, wherein the I/O bus couples an I/O controller hub to at least one I/O device and the I/O controller hub is coupled to the processor.

21. The apparatus of claim 19, wherein the temperature detection unit is further adapted to:
   monitor a signal from a thermal event pin associated with the processor; and
   acknowledge a temperature event within the processor when the monitored signal changes.

22. The apparatus of claim 19, wherein the I/O bus frequency modification unit is further adapted to:
   perform an I/O bus reset for the first I/O bus; and
   alter the I/O bus frequency of the first I/O bus after the I/O bus is reset.

23. The apparatus of claim 19, wherein the temperature detection unit is further adapted to:
   externally monitor the temperature of the processor die; and
   acknowledge a temperature event within the processor when the monitored temperature reaches a predetermined level.

24. The apparatus of claim 19, wherein the temperature detection unit is further adapted to:
   monitor the ambient temperature of the air in a computer system case the processor is enclosed within; and
   acknowledge a temperature event within the processor when the monitored ambient temperature reaches a predetermined level.

* * * * *